United States Patent [19]

Eitzen et al.

[11] 4,122,998
[45] Oct. 31, 1978

[54] OPTICAL CARD READER APPARATUS

[75] Inventors: Vincent E. Eitzen, Marco Island, Fla.; Robert R. Moore, Glenview, Ill.

[73] Assignee: American Hospital Supply Corporation, Evanston, Ill.

[21] Appl. No.: 804,883

[22] Filed: Jun. 9, 1977

[51] Int. Cl.² ................. G06K 13/00; G06K 7/10
[52] U.S. Cl. ................................. 235/475; 235/458
[58] Field of Search .......... 235/61.11 R, 61.11 E, 235/475, 454, 458

[56] References Cited

U.S. PATENT DOCUMENTS

| 3,011,703 | 12/1961 | Rand | 235/61.11 E |
| 3,341,691 | 9/1967 | Modersohn et al. | 235/61.11 E |
| 3,493,771 | 2/1970 | Beltz et al. | 235/61.11 E |
| 3,529,134 | 9/1970 | Ashworth | 235/61.11 E |
| 3,560,717 | 2/1971 | Patterson | 235/61.11 E |
| 3,752,962 | 8/1973 | Greskovics | 235/61.11 R |

Primary Examiner—Daryl W. Cook
Attorney, Agent, or Firm—Tilton, Fallon, Lungmus & Chestnut

[57] ABSTRACT

Apparatus for reading a plurality of apertured cards in sequence in response to a series of command signals includes a supply hopper for storing a vertical stack of cards. The apertures of the cards are located in a matrix of columns and rows. A solenoid-actuated plunger moves the bottom card from beneath the stack and into engagement with a card drive mechanism. The card drive mechanism includes a floating transport equipped with endless tracks for riding on top of cards passed from the bottom of the stack and exerting a substantially constant downward and forward force on the cards while continuously moving each card in sequence across an array of optical detectors in register with the columns on the cards. A line source of light is carried by the transport for illuminating a card along a line parallel to the rows of apertures on the card. As the detectors beneath the cards are illuminated by light passing through the apertures in the cards, binary electrical signals are generated, representative of the information on the cards.

10 Claims, 7 Drawing Figures

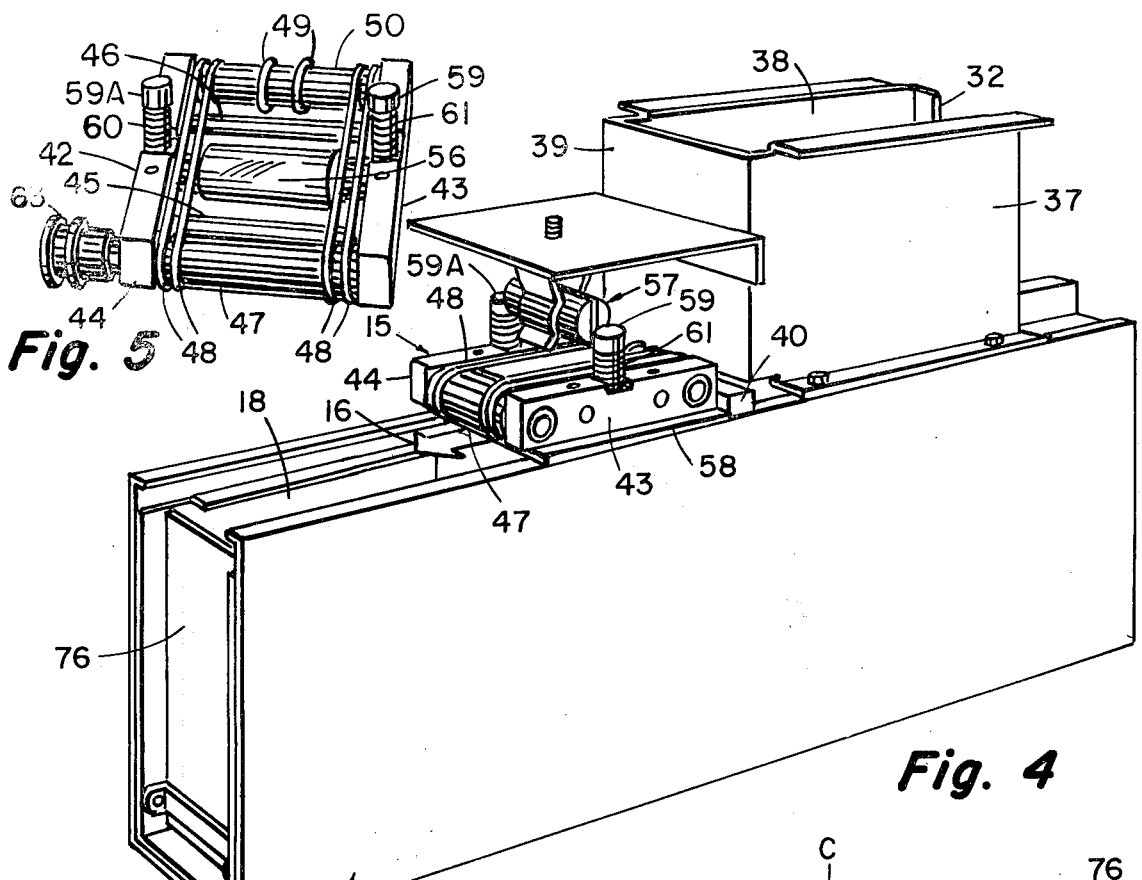
Fig. 5
Fig. 4
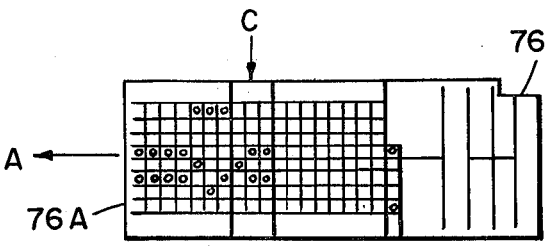
Fig. 7
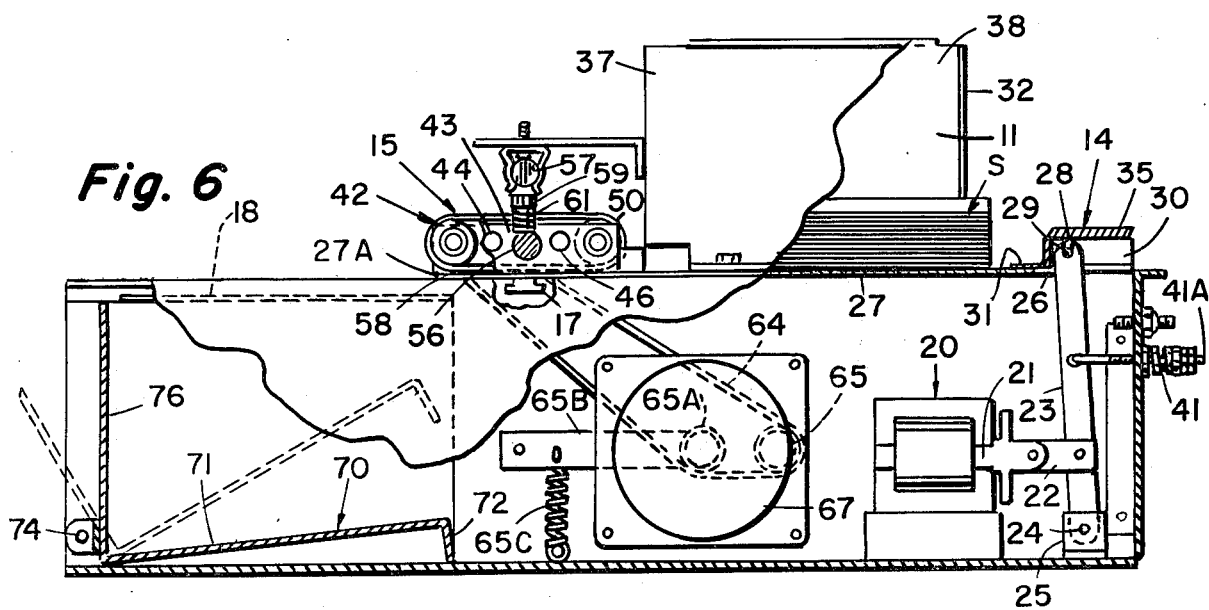
Fig. 6

OPTICAL CARD READER APPARATUS

BACKGROUND AND SUMMARY

The present invention relates to optical card readers. As used herein, the term "optical card reader" refers to apparatus adapted to process opaque cards which are punched or apertured at predetermined locations on a matrix or gridwork so that at each intersection of the grid an aperture comprises one binary signal and the absence of an aperture forms the complementary binary signal. Light is incident on one side of the card, and photodetectors are positioned on the other side of the card to detect light passing through an associated aperture. In the present invention, the gridwork will be referred to as having rows (which extend the width of the card) and columns (which extend lengthwise of the card—i.e., the direction in which the card moves or is processed). The system includes a plurality of photodetectors which are spaced laterally to coincide with the spacing of the columns on the card. Hence, as the card passes over the photodetectors, light either shines through an aperture or is blocked by the absence of an aperture; and each photodetector thereby exhibits a relatively low resistance (logical "0") or a high resistance (logical "1"). The designators are arbitrary and can be interchanged. Bias voltages are connected in circuit with the detectors for generating the actual signals in a conventional manner.

The present apparatus is designed primarily for use in an order-placing system wherein the ordering information, including quantity and product designation, are transmitted via existing telephone lines to a central computer which receives and processes the order. The subscriber has a number of punched plastic cards, and each card is punched so as to order a specific item. Once the purchaser has decided what it is he desires to order, he simply selects the proper cards from a store of cards corresponding to the various items that could possibly be ordered, and he places those cards in a card reader. After establishing contact with the computer through a local telephone hand set and associated terminal equipment, the cards are then read by the optical card reader and the information stored on the cards is converted to signal tones which are transmitted via the telephone line to the computer.

The processing of individual cards is controlled by a return signal from the computer to the remote subscriber responsive to the detection of an "End-of-Card" character on each card and the verification of data transmitted. Thus, the card reader is responsive to a signal transmitted from the computer for initiating the processing of each subsequent card. The remote subscriber apparatus for establishing communication with the computer, converting the binary signals to tones, and performing the other necessary processing is disclosed in copending application for "Electronic Order Placement System using Tone Signals Over Telephone Line" of Eitzen and Johnson, Ser. No. 804,884, filed June 9, 1977, and the disclosure of that application is incorporated herein by reference.

The apparatus of the present invention includes a supply or input hopper for storing the selected cards in a vertical stack. A solenoid-actuated plunger moves the bottom card from beneath the stack upon signal. A drive mechanism engages the bottom card and moves it along a reading path to a reading station.

The card drive mechanism includes a floating transport equipped with endless tracks (which may be formed from elastomeric O-rings) which rides on top of the cards while driving them along the reading path. The transport is loaded downwardly by means of springs which exert a substantially constant downward force on the transport, thereby resulting in a uniform force moving the cards. Each card is moved continuously once it is started in the reading path, and the stack of cards is read seriatim. An array of optical detectors arranged in register with the columns on the cards is located beneath the cards as they pass through the reading station. A lens is carried by the transport for illuminating each card along a line parallel to the rows of apertures on the card. As the photodetectors beneath the cards are illuminated by light passing through the apertures in the cards (or not illuminated, as the case may be), binary electrical signals are generated by the photodetectors representative of the information on the cards.

As the cards pass to the end of the reading path, they fall into a bin where they are collected until all of the cards are read. After an order is placed, the purchaser may return the cards to their original storage locations.

The present invention thus provides a simple and economical optical reader for storing and reading a stack of cards in sequence while moving the cards continuously over a set of photodetectors for converting the punched information on the cards to corresponding binary electrical signals.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 4 is a perspective view of the card reader module of the device of FIG. 1;

FIG. 5 is an upper, frontal erspective view of a floating transport incorporated in the module of FIG. 4;

FIG. 6 is a partly sectioned view of the module of FIG. 4; and

FIG. 7 illustrates a card of the type which may be used with the present invention.

DETAILED DESCRIPTION

Figure 1:
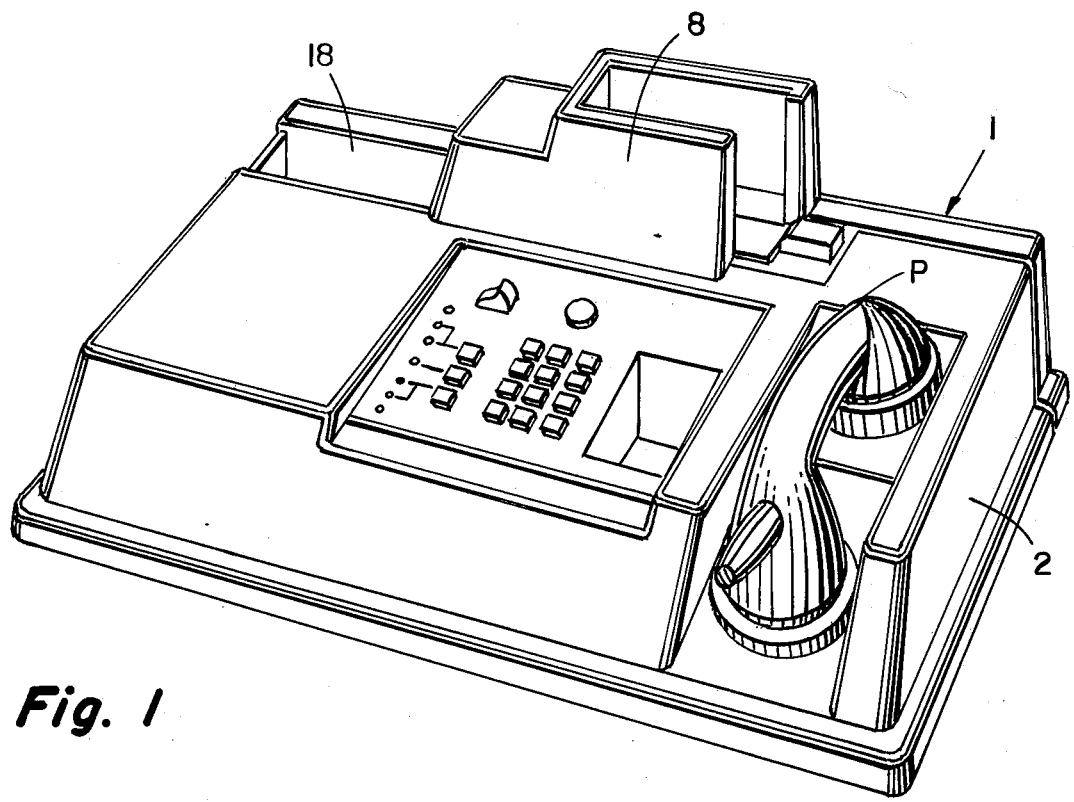
FIG. 1 is an upper right perspective of a device incorporating the present invention.
Figure 2:
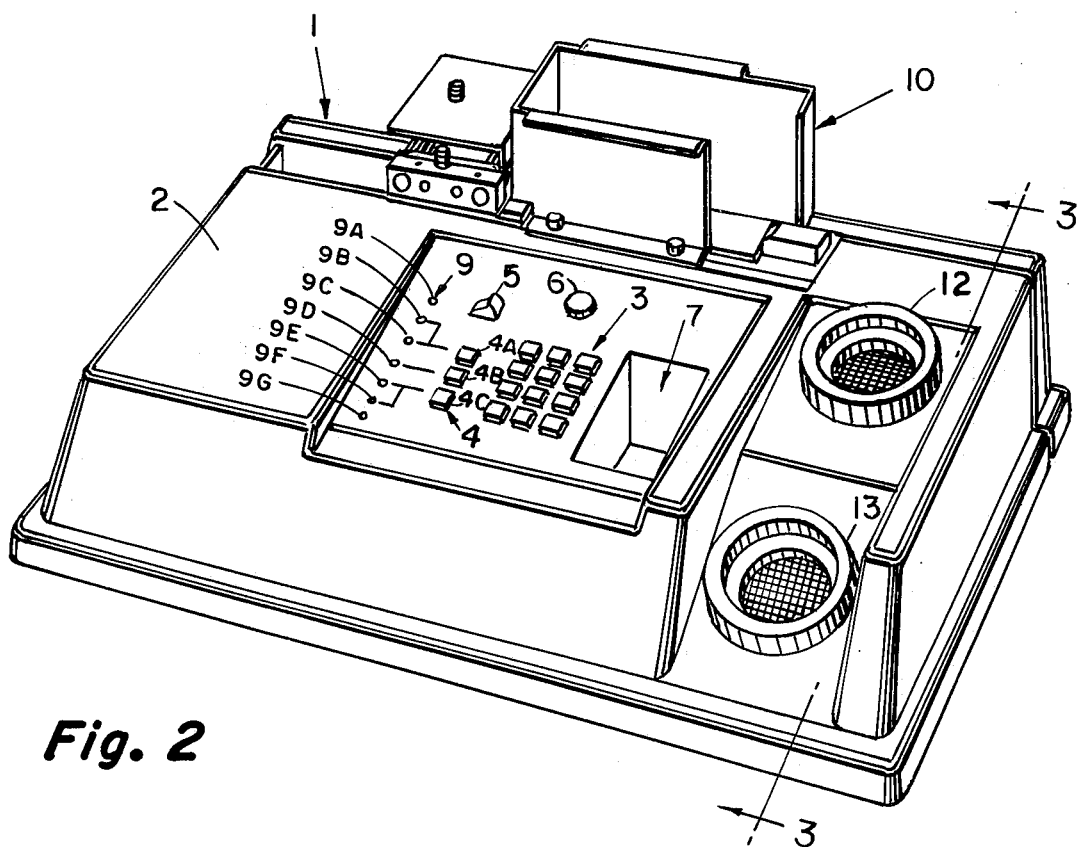
FIG. 2 is a view similar to FIG. 1 with the cover of the card reader module removed.

Referring first to FIGS. 1 and 2, reference numeral 1 generally designates a device including a casing 2 which houses the apparatus. The device includes a keyboard 3, a set of three control keys 4, a power switch 5, a volume control knob 6, and auxiliary storage hopper 7, a card reader module 10 having a cover 8 (which is removed in FIG. 2) and a pair of acoustic coupler cups 12, 13. The coupler cups 12, 13 are spaced to receive a telephone handpiece, designated P in FIG. 1. A series of seven small indicator lights generally designated 9 are associated with the control buttons 4, and they are associated with the following respective functions: 9A is a "READY" indicator, 9B is "CARD REJECT", 9C is "FEED FAILURE," 9D is "STOP," 9E is for automatic feed, 9F is for "MANUAL FEED," and 9G is for "CARD ACCEPT." The indicators 9B and 9C are associated with push switch 4A for reset; indicator 9D is associated with push switch 4B for STOP: and indicators 9E and 9F are associated with push switch 4C for FEED of cards. A supply or input hopper 11 is formed at the top of the module 10 for storing a stack of cards C (FIG. 7). The cards in the supply hopper 11 are selected from a larger storage file. The cards are selected as items (represented by the cards) are needed; and they may be accumulated in the auxiliary hopper 7 until enough are collected to transmit an order. Thus, there may be a larger remote file which contains a card for each item capable of being ordered.

Referring now to FIG. 7, the card C may be 5½ inches long, 2⅛ inches wide, 0.030 inches thick, made of laminated vinyl acetate; and it is opaque. The lower surface is coated with a black material to minimize transmission of visible and infrared radiation through the card except where holes are punched. A notch 76 (¼ inch wide by ½ inch long) is located at one corner of the card to provide desired orientation of the card in the supply hopper relative to the movement of the card, indicated by arrow A. Holes may be punched in any of eight locations or columns spaced 0.200 inches apart across the width of the card; and space is provided for 19 rows of holes 0.200 inches apart along the 5½ inch length of the card starting at the leading edge 76A (i.e., opposite the orientation notch 76). The balance of the card is used for written or printed information used for identification purposes by the user.

The cards are moved from the bottom of the stack S (see FIG. 6) in the supply hopper 11 by means of a pusher or plunger assembly generally designated by reference numeral 14. The plunger, as will be more fully described below, urges the trailing (bottom) edge of a card; and after a card has moved a limited distance, the top edge of the card is engaged by a card drive mechanism, generally designated 15 in FIGS. 4–6, which moves each individual card continuously along a linear "card reading" path, illustrated by arrow 16 in FIG. 4 and over an array of photodetectors, the cross section of one of which is shown at 17 in FIG. 6. This array forms a "read" station. After the cards exit the card drive mechanism, they fall under gravity into a collection hopper 18. After all of the cards have been read and collected, the operator may take the cards from the collection hopper 18 and store them for future use.

Plunger Assembly

Referring particularly to FIG. 6, the plunger or card feeding mechanism includes a solenoid 20 having a coil actuated by a signal from the remote computer indicating that the computer is ready to receive information from another card. Further details on the signaling can be obtained from the above-identified copending application.

When the solenoid 20 is energized, it moves an armature 21 to the left. The armature 21 is connected by means of a link 22 to a lever 23. The lever 23 has one end pinned at 24 to a bracket 25; and its upper end extends through a slot 26 in a top plate 27 of the card reader module, which may be coated with "Teflon" to reduce friction.

The upper end of the lever 23 is slotted at 28 to receive a rod 29 formed in a plunger body 30. The forward end of the plunger body 30 is formed into a tongue 31 having a thickness approximately equal to the thickness of one of the cards C in the input hopper 11. The rear end of the hopper 11 may be open with a vertically projecting flange 32 adapted to fit into the orientation notch 76 in the cards.

The plunger body 30 is received in a guide 35 (see also FIG. 3) defining a rectangular throughway 36 which permits the plunger body 30 to reciprocate within the throughway 36, but not to turn or twist in it.

As seen in FIG. 6, the plunger assembly is biased to the retracted or reset position shown by means of a spring 41 urging a link 41A connected to the lever 23 toward the right.

Turning now to the supply hopper 11, it includes side walls 37, 38 (to which the flange 32 is attached) and a forward wall 39, the lower edge of which is spaced above the top plate 27 to permit the cards to pass, as will be described more fully below.

Card Drive Mechanism

The card drive mechanism 15 (seen best in FIGS. 4, 5 and 6) includes a floating transport generally designated 42. The transport 42 is said to be "floating" because it rides on and is urged with uniform force against the cards passing beneath it and driven by it, as will be more fully understood presently, so as to accommodate itself to variations in the thicknesses of cards while exerting a uniform frictional force on the cards.

The transport 42 thus includes first and second side rails 43, 44 which are rigidly secured into a frame by means of cross rods 45, 46. A forward roller 47 is journaled in side rails 43, 44, and it includes four grooves for receiving four flexible tracks or belts 48 which may be elastomeric O-rings. A rear roller 50 is also journaled in the side rails 43, 44; and it is similarly grooved to receive the tracks 48. In addition, it has two smaller center tracks 49 to insure good frictional contact with the leading edge of a card as one is being fed.

The tracks 48 are spaced so as to engage the marginal edges of the cards and not to invade the matrix of apertures bearing the information.

A cylindrical lens 56 of plastic (such as "Lucite" or other acrylic) is mounted between the midpoints of the rails 43, 44 of the transport apparatus, and beneath a light source 57, which preferably has an elongated filament to produce a "line" of light. The lens 56 thus establishes a line of light extending transverse of the reading path 16; and this line of light is focused onto the array of photodetectors 17. That is, the axis of the lens is spaced at a distance above the photodetectors, considering the width of a card beneath the transport mechanism, such that the line of light is focused onto the active area of the photodetectors at the reading station.

The side rails 43, 44 are spaced above the top plate 27 by spacer bars (see 58 in FIGS. 3 and 4) which permit the drive mechanism to be driven continuously without having the belts rub against the top plate. The rails are secured to the top plate by means of a pair of stripper bolts 59, 59A; and springs 60, 61 are interposed between the heads of the bolts and the associated rails to urge the rails, and hence the entire transport mechanism, downwardly. Thus, the transport mechanism is urged against one side of the cards with substantially constant pressure, while the flexible tracks drive the card beneath the lens 56 and over the photodetectors 17 as it passes along plate 27. The individual cards are "gated" or metered by a machined bar 40 which is mounted to the spacers 58 and extends across the bottom opening of the front wall 39 of the supply hopper, spaced above the top plate to permit one, but not two cards, to pass. Further, the spacer bars 58 are spaced laterally from each other slightly greater than the width of a card, so as to guide the cards and prevent their becoming skewed as they pass over the reading station.

With the structure just described, the transport device "floats" in a manner that permits it to adjust to the thickness of the card passing beneath it while inducing a substantially constant normal force against the cards which provides a substantially constant friction drive force between the endless tracks and the cards being read, thereby providing continuous motion to the cards as they pass through the card reading station.

Figure 3:
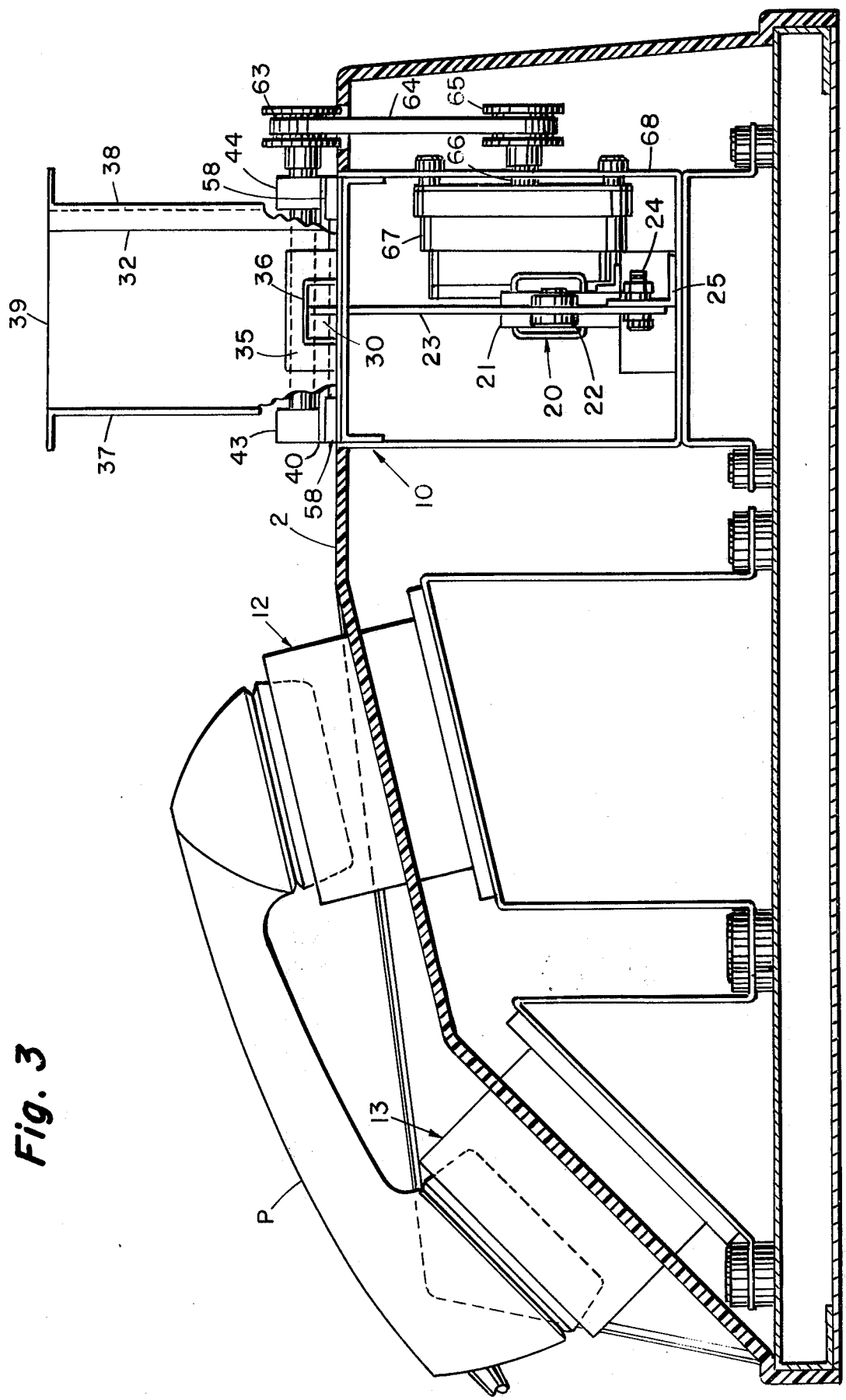
FIG. 3 is a vertical cross sectional view of the apparatus of FIGS. 1 and 2 taken through the sight line 3—3 of FIG. 2.

Referring now to FIGS. 3 and 6, the forward roller 47 of the floating track extends outwardly and is provided with a cogged pulley 63 about which is entrained a cogged belt 64. The belt 64 is also entrained about a second cogged pulley 65 and an idler pulley 65A. Idler pulley 65A is mounted on an arm 65B which is urged by a spring 65C to take up any slack in the drive belt 64. Pulley 65 is mounted to a shaft of an electric drive motor 67. The motor is mounted to a side wall 68 of the card reader module. When the apparatus is in use, the motor 67 is continuously driven, and it preferably is a synchronous motor, to provide constant and accurate speed of the cards through the reading station.

Turning now to the collection hopper 18 of FIG. 6, it includes a metal plate 70 having a first flat portion 71 spaced at an incline by means of an angled portion 72, and shaped to form an end wall 76. The plate 70 is pinned to the side walls by means of a bracket 74. As the cards exit from the card drive mechanism, they fall off an edge 27A of the top plate 27, and into the collection hopper 18; and they may be taken from the hopper simply by rotating the bracket 74 counterclockwise in dashed line in FIG. 6.

Operation

The operation of the apparatus will be clear from the above detailed description which includes the function of the various elements disclosed. Briefly, however, the cards C are stacked vertically in the supply hopper 11 which may hold up to 100 cards. When an electrical signal energizes the solenoid 20, it pulls the armature 21 to the left in FIG. 6. This, in turn, rotates the lever 23 about pivotal connection 24 thereby compressing spring 41. The top of the lever 23 urges the plunger 30 to the left in the feed half of its cycle, and the tongue 31 urges the bottommost card from beneath the stack by engagement with the trailing edge of the card. The leading edge of the card thus selected is fed beneath the gating bar 40 into the card drive mechanism where the floating transport rides above it. The transport is continuously driven by the constant speed motor 67 to drive the flexible tracks 48, 49 to urge the cards across the array of photodetectors 17.

In the case of an aperture at a matrix location on the card, the light produced by the lens 56 from the line source 57 will impinge on the active area of a photodetector beneath the aperture, thereby generating an electrical signal. For each given row of apertures, electrical signals are generated in parallel, and they may be stored in latch circuits disclosed in the above-identified companion application.

The cards are thus fed in sequence from the stack, and once fed from the stack they are moved continuously through the card drive mechanism at constant speed and deposited in the discharge hopper 18 from where they can readily be retrieved when all of the cards have been read.

Having thus described in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. Apparatus for reading a plurality of opaque cards provided with apertures arranged in a grid of rows and columns comprising: supply hopper means for storing said cards in a vertical stack; pusher means responsive to an electrical signal for urging the bottom card of said stack from beneath said stack; stationary plate means adjacent said hopper for slidably engaging the bottom card of said stack and for guiding the card along a reading path when said card is urged from said stack by said pusher means; driver means having card-engaging endless track elements parallel with said plate means for engaging cards urged from beneath said stack by said pusher means and for moving said cards continuously along said reading path; a plurality of photodetector means mounted on one side of said reading path and adapted respectively to detect light passing through said rows of apertures in sequence and for converting incident light to corresponding electrical signals; and a source of light on the other side of said reading path for illuminating said cards only in an area corresponding to the row alignment of apertures therein, whereby each photodetector means will be energized by said source only if said card is apertured at the location above it as the card passes along said reading path.

2. The apparatus of claim 1 wherein said driver means comprises a floating transport and said track elements include first and second flexible, endless track elements disposed above said plate means and spaced apart so as to engage the margins of the upper surface of a card urged by said pusher means for beneath said stack; means for driving said endless track elements in unison; and means for resiliently mounting said transport to said plate means.

3. The apparatus of claim 2 wherein said transport means further comprises a frame including first and second side rails, front and rear shafts, means for rotatably mounting said first and second shafts to said first and second side rails, a pair of pulleys on each of said shafts, said track elements each being entrained about an associated pulley for each shaft.

4. The apparatus of claim 3 further comprising an elongated optical lens secured to said transport means and carried thereby above said photodetectors; and a source of light for illuminating said lens, whereby said cards in said path pass beneath said lens and above said photodetector means.

5. The apparatus of claim 4 wherein said lens comprises a cylindrical element spaced above said photodetectors to focus a line of light transverse of the direction of travel of said cards and parallel to said rows of apertures.

6. The apparatus of claim 1 wherein said pusher means comprises linear actuator means responsive to an electrical signal for urging an armature in linear motion; lever means having one end pivotally connected to a fixed point and an intermediate location connected to said armature; a pusher member defining a tongue having a thickness approximately equal to the thickness of a card and aligned with the rear edge of the bottommost card of said stack and connected to the other end of said lever means; and guide means for guiding said pusher member in linear motion.

7. Apparatus for reading a plurality of opaque cards provided with apertures arranged in a grid of rows and columns comprising: a supply hopper for storing said cards in a vertical stack; pusher means responsive to an electrical signal for urging the bottom card of said stack from beneath said stack; driver mechanism including floating transport means provided with a pair of endless tracks, spaced at a distance approximately the width of a card and adapted to engage each card as it is urged from beneath said stack by said pusher means and for moving said cards sequentially along a reading path; a plurality of photodetectors mounted to said apparatus beneath said path and spaced apart at a distance corresponding to the spacing of said columns on said cards; and a source of light mounted to said supply hopper for generating a line of light parallel to the rows of said cards as they pass along said path beneath said transport means, said line of light being further focused on said photodetectors, whereby for each row of apertures in said cards, individual photodetectors will be energized by said source only if said card is apertured at the location above it as the card passes along said path.

8. The apparatus of claim 7 wherein said apparatus comprises low friction plate means for supporting said cards as they are driven along said path, and wherein said transport means comprises a rigid frame; means for resiliently urging said frame toward said plate means at said card reading station while permitting upward displacement of said frame when a card is passed beneath said transport means; first and second endless tracks carried on said frame for engaging and moving said cards along said path; and first and second spacer plates beneath said frame for supporting said frame such that said tracks are above said plate means, said spacer plates being spaced laterally apart to guide said cards therebetween as said cards advance through said reading station.

9. The apparatus of claim 8 further comprising cylindrical lens means carried by said frame above said photodetector means; a source of light illuminating said lens means, said lens means being spaced above said photodetectors when a card is passing thereunder to focus a line of light on said photodetectors.

10. In apparatus for reading a plurality of opaque cards provided with apertures arranged in a grid of rows and columns, the improvement comprising floating transport mechanism adapted to receive cards supported by a plate and drive them therealong above photodetector means comprising: a frame, means for resiliently mounting said frame to said plate while permitting said frame to be raised by cards passing therebeneath; first and second endless track elements mounted to said frame for driving movement; means for driving said track elements; and cylindrical lens means carried by said frame and spaced above said photodetectors to focus a line of light thereon when actuated by a source of light.

* * * * *